Sept. 17, 1968     D. A. THIBODEAUX     3,401,841

SUGAR CANE PLANTING MACHINE

Filed Feb. 8, 1966     2 Sheets-Sheet 1

INVENTOR
Denis A. Thibodeaux

BY Wilkinson, Mawhinney & Theibautt

ATTORNEYS

Sept. 17, 1968  D. A. THIBODEAUX  3,401,841
SUGAR CANE PLANTING MACHINE
Filed Feb. 3, 1966  2 Sheets-Sheet 2

INVENTOR
Denis A. Thibodeaux
BY Wilkinson, Mawhinney & Theibault
ATTORNEYS

United States Patent Office

3,401,841
Patented Sept. 17, 1968

3,401,841
SUGAR CANE PLANTING MACHINE
Denis A. Thibodeaux, Rte. 2, Napoleonville, La. 70390
Filed Feb. 8, 1966, Ser. No. 525,886
2 Claims. (Cl. 222—177)

ABSTRACT OF THE DISCLOSURE

The disclosure of this invention pertains to an apparatus operative to deposit sugar cane in furrows in lengthwise substantially horizontal position through trap doors actuated to open and closed positions in definite time sequence influenced by the rotation of a ground wheel of the apparatus.

---

The present invention relates to sugar cane planting machine and has for an object to provide a machine by which stalks or canes, suitable for planting, are periodically released from a container or hopper to be dropped into the furrow as the machine proceeds along the field.

Another object of the invention is to provide improved discharge means by which the canes are released in a lengthwise substantially horizontal position and in a timed relation to the progress or speed of movement of the machine along the furrow with the result that canes of substantial length will be deposited to lie endwise so that substantially complete coverage of the field is obtained with the result that maximum high yield crop is secured.

These objects are achieved in a simple form of vehicle which may be towed behind a cane supply vehicle whereby the container or hopper can be continuously fed from the source of supply while the two vehicles are in transit.

The invention also contemplates the provision of a novel form of mechanism, driven inexpensively from the motion of the wheels on which the planter is supported and movable whereby trap doors which preferably constitute the discharge means are operated in definite time sequence.

With the foregoing and other objects in view, the invention will be more particularly pointed out in the claims appended hereto.

In the drawings, wherein like symbols refer to like or corresponding parts throughout the several views.

Figure 1:
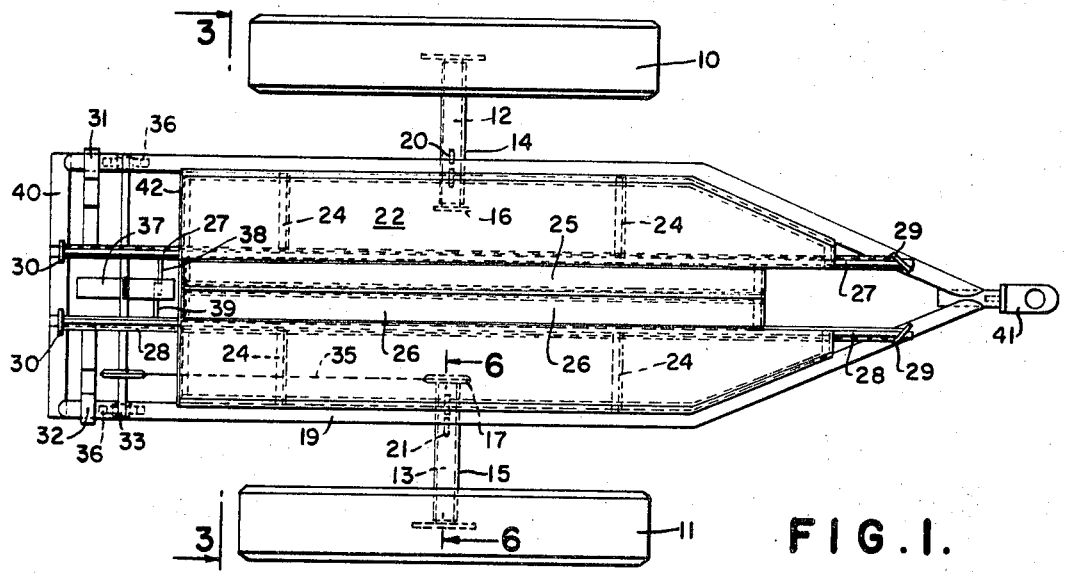
FIGURE 1 is a top plan view of a sugar cane planting machine constructed in accordance with the present invention.
Figure 2:
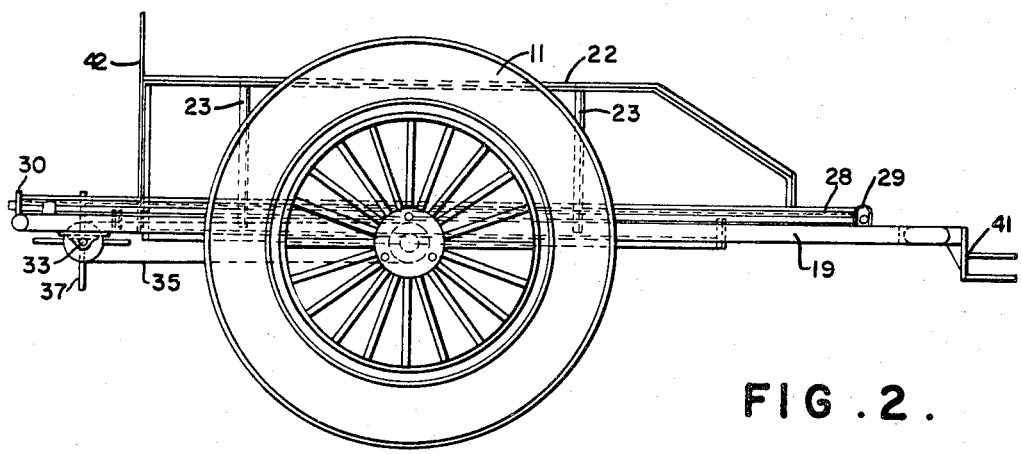
FIGURE 2 is a side elevational view of the same.

Referring more particularly to the drawings, 10 and 11 indicate ground wheels suitable for moving over a cane field and 12 and 13 are the rotating stub axles which are affixed to the hubs of the wheels and rotated therewith. Sleeves 14 and 15 are fitted over the stub axles and are independently rotatable thereabout. The outer ends of the sleeves abut against the hubs of the wheels. A flange 16 on the inner end portion of one of the axles, for instance, the axle 12 confines the sleeve 14 and prevents the sleeve from being accidentally displaced from the axle 12.

This service for the companion sleeve is performed by a sprocket 17 which is affixed to the inner end portion of the axle 13 and rotates therewith for generating motion to drive the tripper mechanism as later explained.

Side longitudinal frame members 18 and 19 at intermediate portions are welded by webs 20 and 21 to the sleeves 14 and 15 so that the frame, together with the sleeves, is subject to rocking or tilting motion about the wheel axles as a transverse axis.

A container 22 for the canes or stalks, preferably in the form of an open trough, is mounted between the wheels 10 and 11, being supported from the side longitudinal frame members 18 and 19 by suitable bracing, for instance, the upright braces 23 and the lateral braces 24, which are affixed to side walls of the container and to the side members 18 and 19 by welding or otherwise.

The container 22 is open at its top and preferably converges as to its longitudinal side walls downwardly to a bottom opening through which the canes are deposited in the furrows under the control of appropriate discharge means, one form of which is shown by the double or twin trap doors 25 and 26. These doors are affixed to and suspended from shafts 27 and 28 mounted at their forward ends in front bearings 29 and at their rear ends in bearings 30.

The front bearings are supported in forwardly convergent ends of the side members 18 and 19; while the rear bearings 30 are carried by a suitable transverse rear frame member 40 which may be secured to the rear ends of the side frame members 18 and 19.

Figure 3:
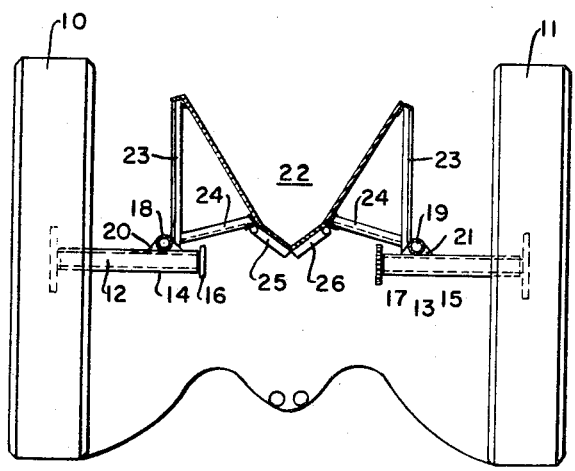
FIGURE 3 is a transverse sectional view taken on the line 3—3 in FIGURE 1 looking forwardly.

In FIGURE 3 the pair of doors 25 and 26 are shown in the closed position to converge downwardly so that their free ends are brought substantially together by the use of counterweights 31 and 32 (FIGURES 4 and 5) which are also affixed to the shafts 27 and 28. By this means the doors are biased to the closed position, shown in FIGURES 3 and 4.

Figure 4:
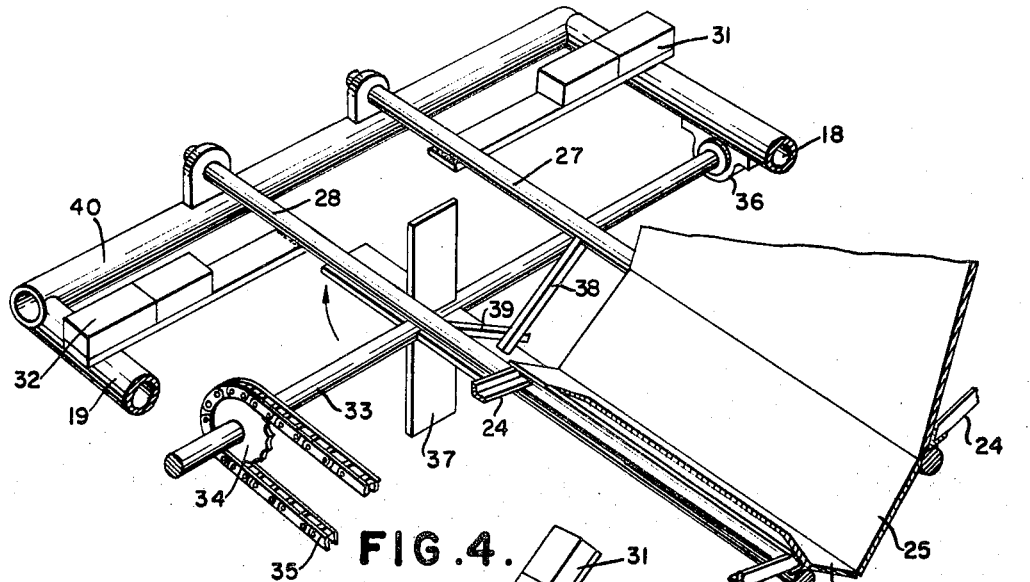
FIGURE 4 is a fragmentary perspective view showing the operating mechanism with the trap doors in the closed positions.
Figure 5:
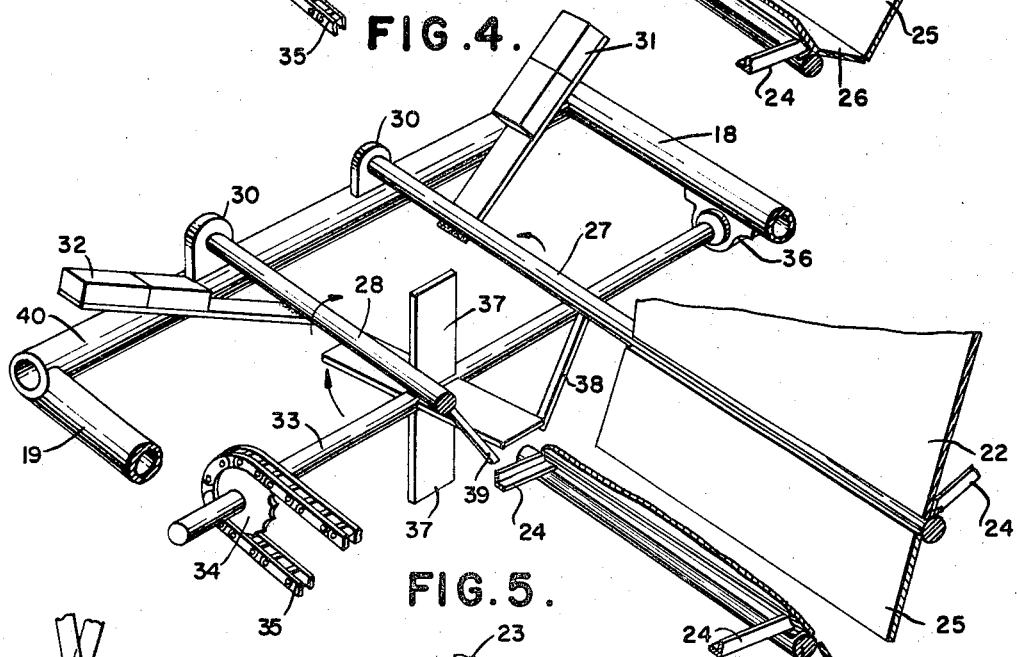
FIGURE 5 is a similar view showing the paddle engaging the arms and the trap doors in the open positions.
Figure 6:
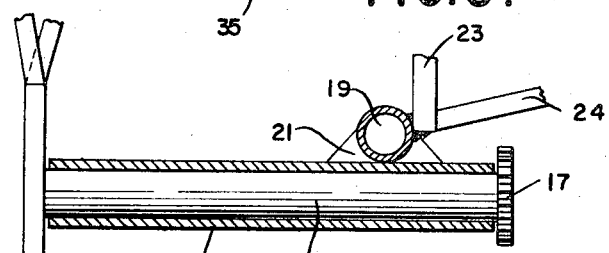
FIGURE 6 is a transverse sectional view taken on an enlarged scale on the line 6—6 in FIGURE 1, looking rearwardly.

A tripper shaft 33 is mounted transversely of the machine at the rear portion thereof in suitable bearings 36 dependent from rear portions of the side members 18 and 19, as shown more particularly in FIGURES 4 and 5. This shaft is driven by a roller or other chain 35 trained about the front sprocket 17 and about a rear sprocket 34 made fast to the shaft 33. A paddle wheel 37 is affixed to the shaft 33 in position for its blades to encounter arms 38 and 39 affixed to the trap door shafts 27 and 28.

The paddle wheel may have a suitable number of paddles projecting radially or otherwise therefrom at appropriate angular distances apart. For example, four such blades 37 are shown in the drawings arranged at ninety degree angular distances apart. The paddles, incident to rotation thereof, derived from the wheel 11, descend in succession upon the arms 38 and 39 which are normally crossed and in downwardly convergent relation, shown in FIGURE 4, whereby the arms will be spread, rotating the shafts 27 and 28 in relatively opposite directions to cause opening of the trap doors 25 and 26 affixed to such shafts in the manner illustrated in FIGURE 5.

In other words, the blades of the paddles wipe downwardly and slidingly on the arms 38 and 39 and when an incident paddle blade 37 passes beneath the lower free ends of the arms 38, 39, such arms are freed and the shafts 27 and 28 and the trap doors 25 and 26 are then returned to the influence of the counterweights 31 and 32 which have been previously lifted to the positions of FIGURE 5 and thereby return to the position of FIGURE 4 where such counterweights may rest upon rear portions of the side frame members 18 and 19.

A hitch 41 is affixed at the front end of the frame for connection to a tractor or a supply vehicle containing a supply of the canes or stalks in such relation that an operator in the supply vehicle may throw canes therefrom into the trough 22. The container or trough is so shaped that it will orient the entering canes into a longitudinal direction gravitating to the lower narrower part of the trough where the canes are supported directly or indirectly upon the trap doors. The trough is long in relation to the canes and the action of the paddle tripper may be adjusted by changing sprocket diameters to give required results in a percentage of delivery of canes to the furrow.

A successful machine has been found to be mounted on two ground wheels 10 and 11 of dimensions as follows: tread width 9.00 inches, diameter 36 inches. The trough is substantially V-shaped, 8 feet long and 2 feet deep. At the bottom of the trough is a double trap door which is tripped open four times, every time the carriage wheels make one complete rotation. The trap doors are closed by the counterweights promptly after each opening movement as soon as the paddle blade clears the arms 38 and 39.

The machine is pulled behind a conventional sugar cane wagon and the cane stalks are thrown into the trough manually, two or three stalks at a time.

The tripping mechanism is in effect a metering device which is important if sugar cane is to be properly planted.

The trough may be crossed at its rear end by a back plate 42.

Any drive ratio of the sprockets and chains relative to the dimensions of the ground wheels may be used. The normal wagon wheel, including the tire thereon, has a diameter of approximately 5 feet. The sprocket affixed to the axle is a ratio of 1 to 1 to the wheel. The trap doors open and close four times for every full revolution of the wagon wheel. Since the wagon wheel itself controls the intermittent opening and closing of the trap doors, the progress of the wagon in the field, whether slow or fast, will control the related opening and closing of the trap doors to either slow or fast.

Although I have disclosed herein the best form of the invention known to me at this time, I reserve the right to all such modifications and changes as may come within the scope of the following claims.

What is claimed is:
1. A planter for cane stalks comprising
   (a) a mobile frame,
   (b) a container for the stalks on the frame having an open bottom,
   (c) a pair of trap doors mounted on the frame for moving between masking and unmasking positions for the said open bottom,
   (d) means for moving the doors to their unmasking position comprising
   (e) two arms operatively connected at one end to the doors,
   (f) common means engaging said arms to actuate the arms so that they move the doors to their unmasking position,
   (g) means for returning the doors to their masking position,
   (h) oppositely rotatable shafts on which said arms are mounted for rotation therewith and said arms having their opposite ends extending inwards so that said opposite ends are adjacent one another,
   (i) said trap doors also being mounted on said shafts for rotation therewith,
   (j) said common means comprising a rotatable tripper shaft,
   (k) a paddle wheel fixed on said tripper shaft and having
   (l) a plurality of paddles on said wheel for successively engaging the adjacent ends of said arms to move the arms away from one another to rotate the trap door shafts to move the trap doors to their unmasking positions to open the bottom of the container to permit the stalks to fall through the open bottom into furrows in the ground.

2. A planter as claimed in claim 1 wherein the adjacent end portions of the arms are crossed and the crossed portions of the arms are disposed in the path of said paddles so that the paddles successively engage both crossed portions of the arms simultaneously to move both said trap doors to their unmasking position at spaced-apart intervals.

References Cited

UNITED STATES PATENTS

| | | | |
|---|---|---|---|
| 2,637,263 | 5/1953 | Schmitz | 111—3 X |
| 2,639,571 | 5/1953 | Kelly | 222—177 X |
| 2,721,678 | 10/1955 | Gill | 222—503 X |
| 3,112,832 | 12/1963 | Lachance et al. | 298—35 X |
| 3,266,679 | 8/1966 | Arbel | 222—503 |
| 3,207,379 | 9/1965 | Waldrum | 222—177 |

ROBERT B. REEVES, *Primary Examiner.*